(12) United States Patent
Kiyamura

(10) Patent No.: US 9,400,397 B2
(45) Date of Patent: Jul. 26, 2016

(54) OPTICAL APPARATUS WITH MOVABLE MEMBER FOR SHAKE CORRECTION

(75) Inventor: Kousuke Kiyamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1061 days.

(21) Appl. No.: 13/430,786

(22) Filed: Mar. 27, 2012

(65) Prior Publication Data

US 2012/0250155 A1 Oct. 4, 2012

(30) Foreign Application Priority Data

Mar. 31, 2011 (JP) ................. 2011-079556

(51) Int. Cl.
*G02B 27/64* (2006.01)
*G03B 5/00* (2006.01)

(52) U.S. Cl.
CPC ............... *G02B 27/646* (2013.01); *G03B 5/00* (2013.01); *G03B 2205/0015* (2013.01); *G03B 2205/0069* (2013.01); *G03B 2217/005* (2013.01)

(58) Field of Classification Search
None
See application file for complete search history.

(56) References Cited

U.S. PATENT DOCUMENTS

| 8,078,042 | B2 | 12/2011 | Hagiwara et al. |
| 2006/0269262 | A1 | 11/2006 | Shin et al. |
| 2010/0195996 | A1* | 8/2010 | Hagiwara et al. ............... 396/85 |

FOREIGN PATENT DOCUMENTS

| CN | 1869763 A | 11/2006 |
| CN | 101794054 A | 8/2010 |
| JP | 10-010597 A | 1/1998 |
| JP | 2004-101721 A | 4/2004 |
| JP | 2006-330678 A | 12/2006 |
| JP | 2010-133501 A | 6/2010 |
| JP | 2010-152020 A | 7/2010 |

OTHER PUBLICATIONS

Notification of First Office Action issued in Counterpart Chinese Patent Application No. 201210078557.8, dated Jun. 13, 2014. English translation provided. References cited in Office Action, previously cited Jul. 15, 2014.
Notification of First Office Action issued in Counterpart Chinese Patent Application No. 201210078557.8, dated Jun. 13, 2014. English translation provided.
Japanese office action issued in Japanese corresponding application JP2011-079556, dated Apr. 16, 2013.

* cited by examiner

*Primary Examiner* — Stephone B Allen
*Assistant Examiner* — James McGee
(74) *Attorney, Agent, or Firm* — Rossi, Kimms & McDowell LLP

(57) ABSTRACT

An image shake correction device capable of reducing a sliding friction force occurring with movement of a movable member, thereby reducing load on a drive unit for driving the movable member and improving the positioning accuracy of the movable member. The movable member of the correction device is supported to be movable in a yaw direction and supported to be pivotable in a pitch direction, and a ball is held between the movable member and a guide groove formed in a stationary member and extending in the yaw direction. When the movable member moves in the yaw direction, the ball rolls along the guide groove. When the movable member pivots in the pitch direction, a contact point where the movable member contacts with the ball functions as a pivotal fulcrum for the movable member.

18 Claims, 8 Drawing Sheets

US 9,400,397 B2

OPTICAL APPARATUS WITH MOVABLE MEMBER FOR SHAKE CORRECTION

BACKGROUND OF THE INVENTION

1. Field of the Invention

The present invention relates to an image shake correction device mounted on an optical apparatus such as a digital camera, binocular, and telescope, and relates to an optical apparatus and an image pickup apparatus each having the image shake correction device.

2. Description of the Related Art

An image shake correction device mounted on a digital camera or the like has a movable member that holds a lens or an image pickup device. The movable member must be movable independently in a left-right direction (yaw direction) and in an up-down direction (pitch direction) with respect to an optical axis.

To this end, a technique has been proposed in which a shaft formed on one of a movable member and a stationary member is engaged with an elongated hole formed in another of them (Japanese Laid-open Patent Publications Nos. H10-10597 and 2010-152020). In this technique, the movable member is supported to be movable relative to the stationary member in a first direction along the elongated hole and supported to be pivotable about the shaft in a second direction perpendicular to the first direction, so that the movable member can be movable independently in these two different directions.

However, due to a sliding friction force occurring between the shaft and the elongated hole with movement of the movable member, load on an actuator for driving the movable member increases and the positioning accuracy of the movable member is lowered.

SUMMARY OF THE INVENTION

The present invention provides an image shake correction device capable of reducing a sliding friction force occurring with movement of a movable member, thereby reducing load on a drive unit for driving the movable member and improving the positioning accuracy of the movable member, and provides an optical apparatus and an image pickup apparatus each having the image shake correction device.

According to one aspect of this invention, there is provided an image shake correction device, which comprises a stationary member, a movable member configured to be supported movably in a first direction relative to the stationary member and configured to be supported pivotably relative to the stationary member in a second direction different from the first direction, wherein a first guide groove extending in the first direction is formed in one of the stationary member and the movable member, a rolling member configured to be held between the first guide groove and another of the stationary member and the movable member, wherein the rolling member rolls along the first guide groove when the movable member moves in the first direction and a contact point where the movable member contacts with the rolling member functions as a pivotal fulcrum for the movable member when the movable member pivots in the second direction, an urging unit configured to urge the stationary member and the movable member in directions to hold the rolling member, and a drive unit configured to drive the movable member in the first and second directions.

With this invention, it is possible to reduce a sliding friction force occurring with movement of the movable member, whereby load on the drive unit for driving the movable member can be reduced and the positioning accuracy of the movable member can be improved.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

(First Embodiment)

Figure 1:
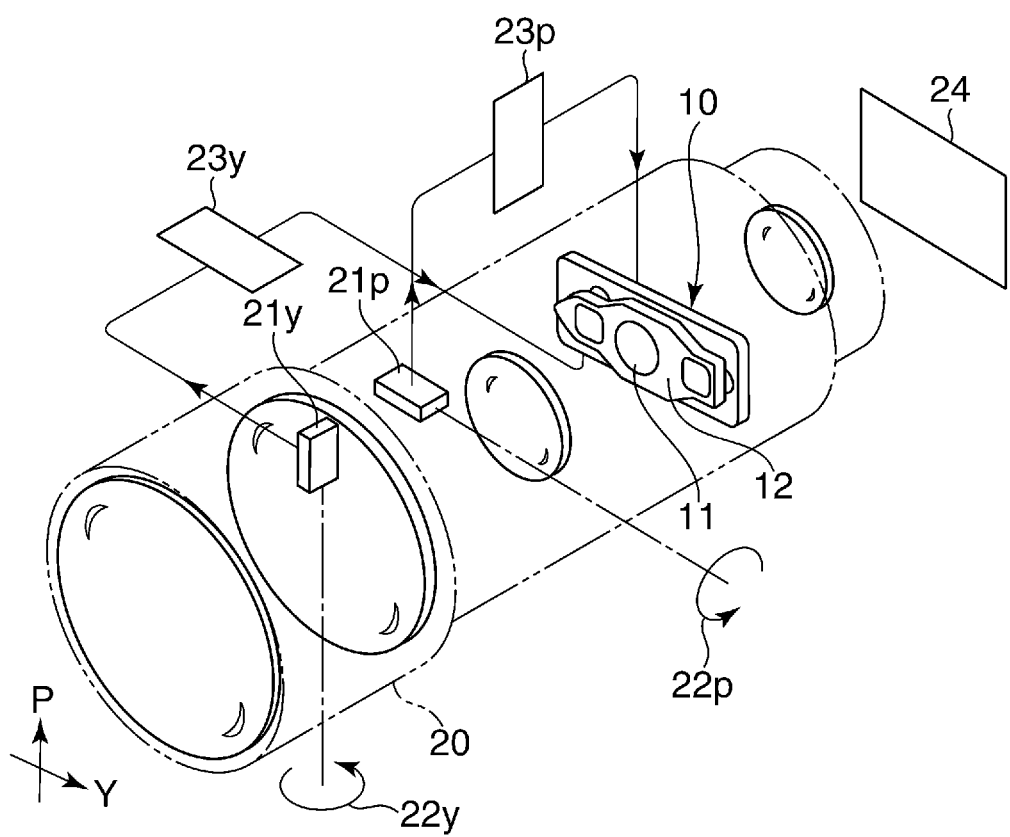
FIG. 1 is a perspective view schematically showing a lens barrel mounted with an image shake correction device according to a first embodiment of this invention.

FIG. 1 schematically shows in perspective view a lens barrel serving as an optical apparatus on which an image shake correction device according to a first embodiment of this invention is mounted.

As shown in FIG. 1, the image shake correction device 10 of this embodiment is disposed inside the lens barrel 20 of the optical apparatus (e.g., a digital camera), and corrects image shakes caused by camera shakes in yaw and pitch directions (hereinafter respectively referred to as the Y and P directions). It should be noted that the Y and P directions are perpendicular to each other in this embodiment, but this is not limitative.

Angle displacement detection devices $21y$, $21p$ detect shake angle displacements $22y$, $22p$ of the camera in the Y and P directions and output angle displacement signals, respectively. Based on these angle displacement signals supplied from the detection devices $21p$, $21y$, computation circuits $23p$, $23y$ respectively compute target drive signals.

In accordance with the target drive signals supplied from the computation circuits $23p$, $23y$, a drive unit of the image shake correction device 10 causes a movable barrel 12 that holds a correction lens 11 to move in a plane perpendicular to an optical axis, thereby correcting a shake of an image formed on an image plane of an image pickup apparatus 24.

It should be noted that in this embodiment, position sensors that detect Y- and P-direction positions of the movable barrel 12 can be provided for execution of closed-loop control to make output signals of the position sensors coincident with respective ones of the target drive signals. Alternatively, open-loop control can be carried out without using the position sensors.

Figure 2:
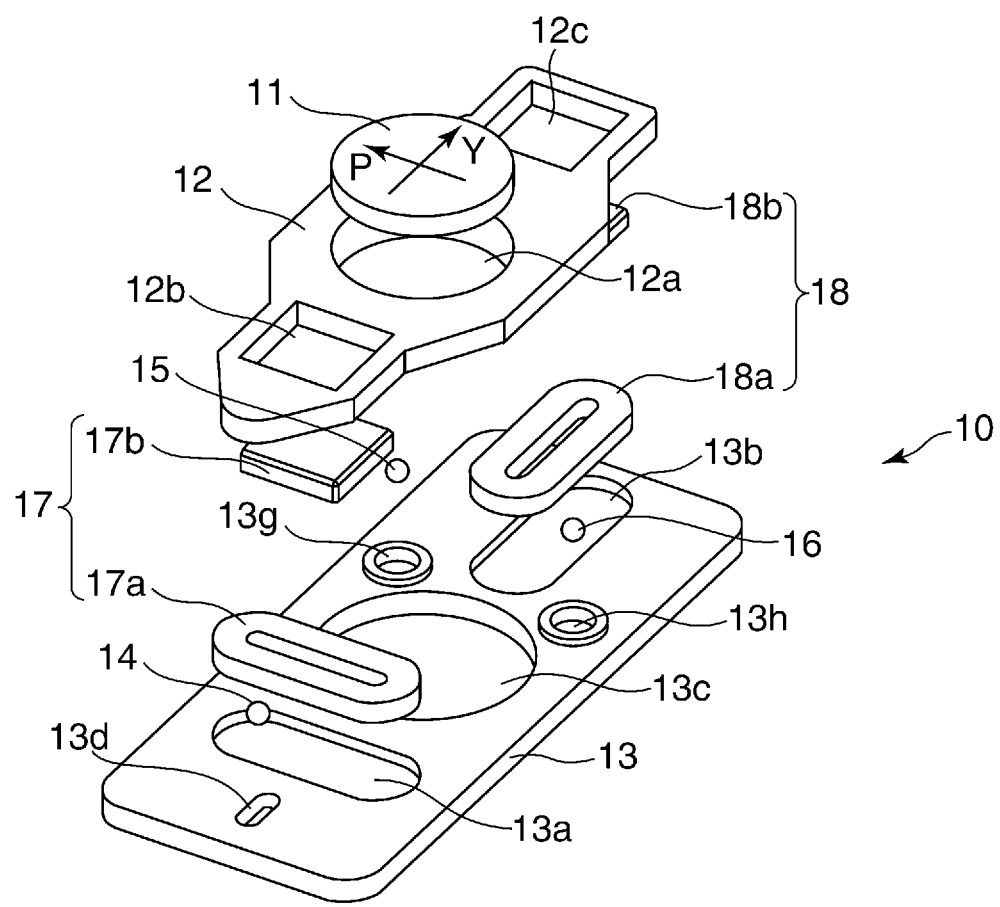
FIG. 2 is an exploded perspective view of the image shake correction device.
Figure 3:
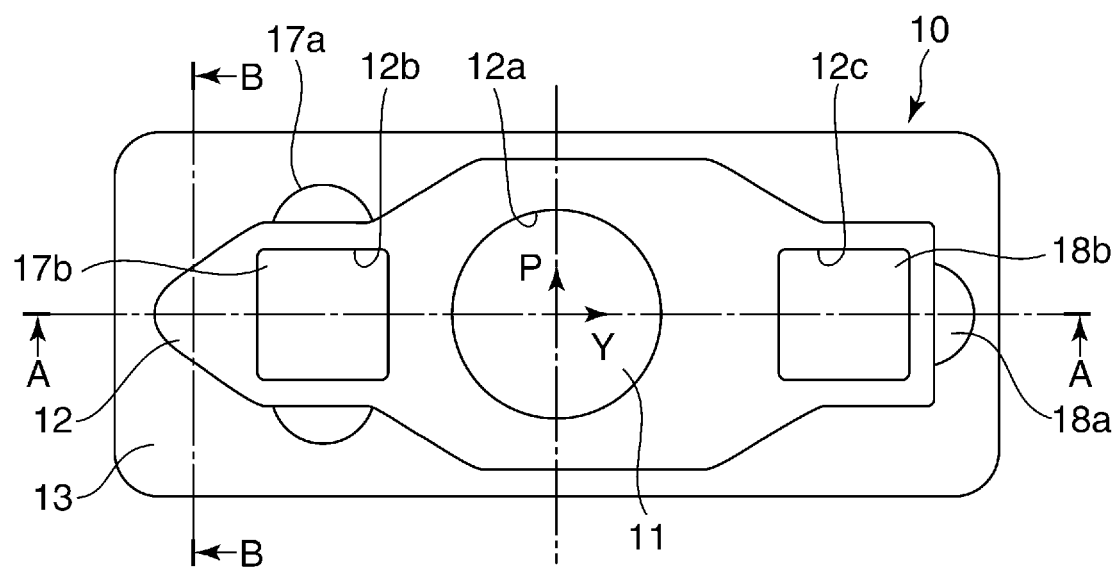
FIG. 3 is a view of the image shake correction device as seen from one side in an optical axis direction.
Figure 4:
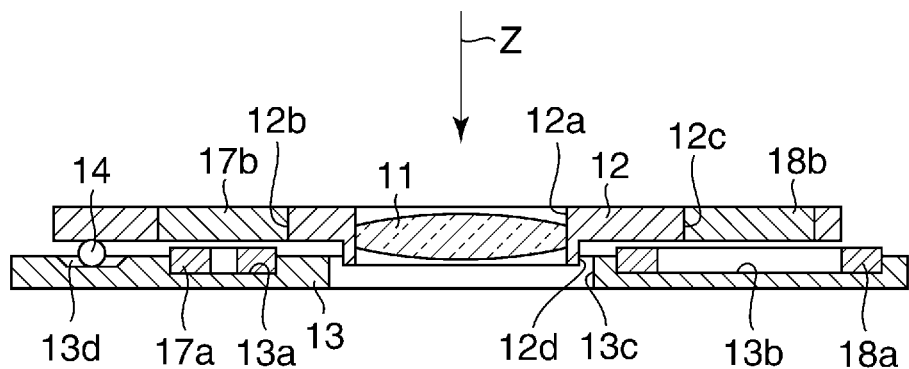
FIG. 4 is a section view taken along line A-A in FIG. 3.
Figure 5A:
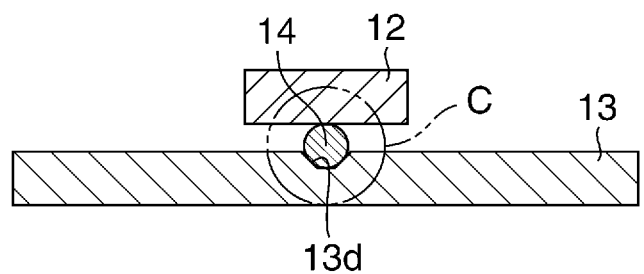
FIG. 5A is a section view taken along line B-B in FIG. 3.
Figure 5B:
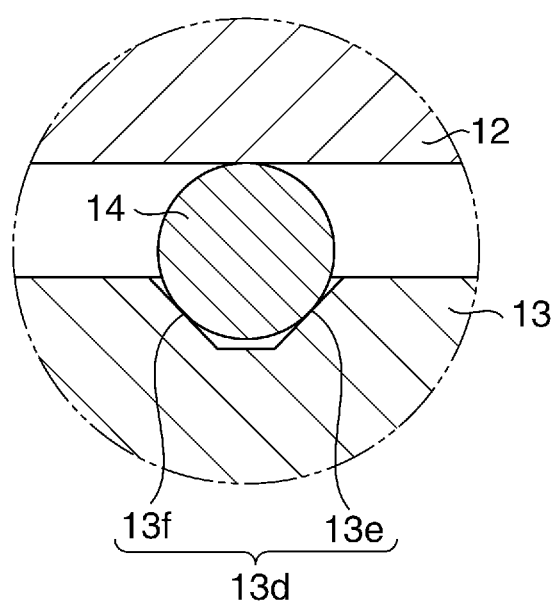
FIG. 5B is an enlarged view of C part of FIG. 5A.

Next, a description will be given of the image shake correction device 10 with reference to FIGS. 2 to 5. FIG. 2 shows the image shake correction device 10 in exploded perspective view, FIG. 3 shows the correction device 10 as seen from one side in the optical axis direction, FIGS. 4 and 5A are section views respectively taken along lines A-A and B-B in FIG. 3, and FIG. 5B shows C part of FIG. 5A in enlarged view.

As shown in FIGS. 2 to 5, the image shake correction device 10 of this embodiment includes the movable barrel 12 that holds the correction lens 11 and includes a stationary base plate 13, balls 14 to 16, a first actuator 17, and a second actuator 18.

The movable barrel 12 (which is an example of a movable member of this invention) is formed with a central circular hole 12a for holding the correction lens 11, and is supported to be movable relative to the stationary base plate 13 in a plane perpendicular to the optical axis. The movable barrel 12 has a surface facing the stationary base plate 13 and formed into a flat plane perpendicular to the optical axis. At a central portion of the flat plane surface of the movable barrel 12, a cylindrical portion 12d (see FIG. 4) is formed coaxially with the central hole 12a so as to project toward the stationary base plate 13.

The movable barrel 12 is also formed with rectangular holes 12b, 12c on both sides of the central hole 12a as seen in the Y direction. A first magnet 17b that cooperates with a first coil 17a to constitute the first actuator 17 is fitted and fixed to the hole 12b, and a second magnet 18b that cooperates with a second coil 18a to constitute the second actuator 18 is fitted and fixed to the hole 12c. It should be noted that in this embodiment the correction lens 11 is used as an optical system for image shake correction. Alternatively, an image pickup device (such as a CCD sensor or a CMOS sensor) that is movable in a direction perpendicular to the optical axis can be used.

The stationary base plate 13 (which is an example of a stationary member of this invention) is formed into a rectangular plate elongated in the Y direction and is disposed parallel to the movable barrel 12. The stationary base plate 13 is formed with a central circular hole 13c, which is larger in diameter than the cylindrical portion 12d of the movable barrel 12. The cylindrical portion 12d is axially inserted into the hole 13c, whereby a movable range of the movable barrel 12 relative to the stationary base plate 13 is restricted. At an outer periphery of the base plate 13, there is provided a mounting portion (not shown) to which the lens barrel that supports a taking lens group is fixed.

When the movable barrel 12 is at a reference position (initial position) shown in FIGS. 3 and 4, the correction lens 11 held by the movable barrel 12 is disposed coaxially with the hole 13c of the stationary base plate 13.

The stationary base plate 13 is also formed with an elongated hole 13a long in the P direction and an elongated hole 13b long in the Y direction on both sides of the central hole 13c as seen in the Y direction. The first coil 17a of the first actuator 17 is fitted and fixed to the elongated hole 13a, and the second coil 18a of the second actuator 18 is fitted and fixed to the elongated hole 13b.

When the movable barrel 12 is at the reference position shown in FIGS. 3 and 4, a line connecting the centers of the first and second coils 17a, 18a passes through the center of the correction lens 11 (i.e., the optical axis), and the centers of the first and second magnets 17b, 18b are aligned in position with the centers of the first and second coils 17a, 18a, respectively.

The stationary base plate 13 is further provided with cylindrical ball receiving portions 13g, 13h in respective ones of which balls 15, 16 are disposed to be rollable. The ball receiving portions 13g, 13h are disposed symmetrical to each other with respect to the longitudinal axis of the stationary base plate 13. In this embodiment, the ball receiving portions 13g, 13h are located between the elongated hole 13b and the central hole 13c, i.e., between the center of the second actuator 18 and the center of the correction lens 11 (the optical axis) as seen in the longitudinal direction of the stationary base plate 13, thereby enabling the balls 15, 16 to support the movable barrel 12 at near the center of gravity of the movable barrel 12. It should be noted that the ball receiving portions 13g, 13h are formed to have inner diameters larger than the diameters of the balls 15, 16 and corresponding to the movable range of the movable barrel 12.

A guide groove 13d, which is a V-shape in cross section and extends in the Y direction, is formed in the stationary base plate 13 at a position opposite from the hole 13c with respect to the elongated hole 13a. The guide groove 13d has its center located on an extension of a line connecting the centers of the first and second coils 17a, 18a. When the movable barrel 12 is at the reference position shown in FIGS. 3 and 4, the center of the correction lens 11 (i.e., the optical axis) is disposed on an extension of the longitudinal axis of the guide groove 13d.

In this embodiment, the guide groove 13d is disposed on the side opposite from the second actuator 18 as seen in the longitudinal direction of the stationary base plate 13 with respect to the central hole 13c in which the correction lens 11 is received. In other words, the ball 14 in the guide groove 13d is disposed on the side opposite from the second actuator 18 with respect to the correction lens 11 in the hole 13c as seen in the longitudinal direction of the base plate 13. Accordingly, the movable barrel 12 can have a large pivot radius when driven by the second actuator 18 to pivot about a contact point with the ball 14, i.e., about a pivotal fulcrum. It should be noted that the guide groove 13d is an example of a first guide groove of this invention.

The guide groove 13d of the stationary base plate 13 has inclined surfaces 13e, 13f each being in contact with the ball 14 at one point, so that the ball 14 is in contact at two points with the guide groove 13d. In this embodiment, the ball 14 is also in contact with the movable barrel 12 at one point. In a state held between the movable barrel 12 and the stationary base plate 13, the ball 14 is supported by three points to be rollable in the Y direction.

The balls 15, 16 are each in contact with the movable barrel 12 at one point and in contact with the stationary base plate 13 at one point. In a state held between the movable barrel 12 and the stationary base plate 13, each of the balls 15, 16 is supported by two points to be rollable in the movable range of the movable barrel 12.

In this embodiment, the first and second actuators 17, 18 (an example of drive devices of a drive unit of this invention) are each implemented by a voice coil motor.

When electric power is supplied to the coil 17a of the first actuator 17, a force is applied to the magnet 17b of the first actuator 17 in a direction perpendicular to the longitudinal axis of the coil 17a (i.e., in the Y direction in this embodiment).

Figure 6:
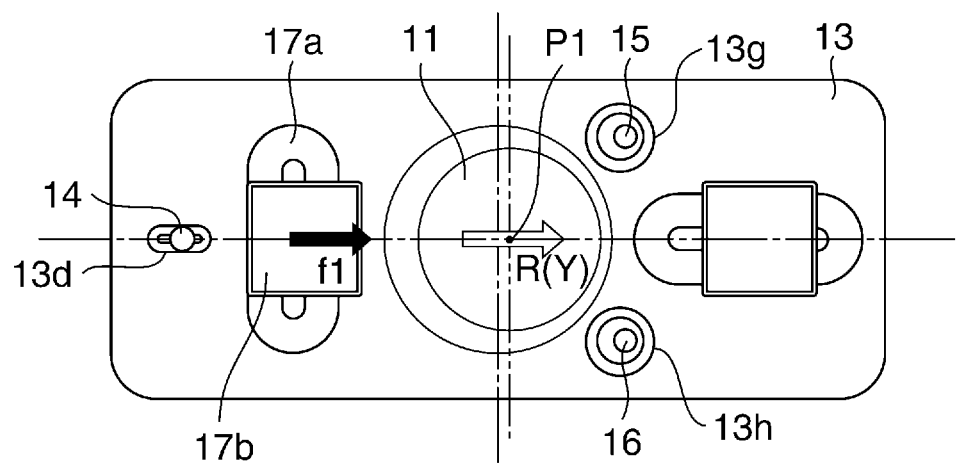
FIG. 6 is a view showing a state where forward power is applied to a first coil of a first actuator of the image shake correction device.

FIG. 6 shows a state where forward power is applied to the first coil 17a of the first actuator 17. It should be noted that an illustration of the movable barrel 12 is omitted in FIG. 6 for convenience of description.

In the state shown in FIG. 6, a Lorentz force is generated between the coil 17a and magnet 17b of the first actuator 17, so that a force f1 acting in the Y direction (i.e. in a first direction) is applied to the magnet 17b fixed to the movable barrel 12. As a result, the movable barrel 12 moves in a R direction while causing the balls 14 to 16 to roll, so that the center of the correction lens 11 held by the movable barrel 12 moves to a position denoted by symbol P1.

When electric power is supplied to the coil 18a of the second actuator 18, a force is applied to the magnet 18b of the second actuator 18 in a direction perpendicular to the longitudinal axis of the coil 18a (i.e., in the P direction in this embodiment).

Figure 7:
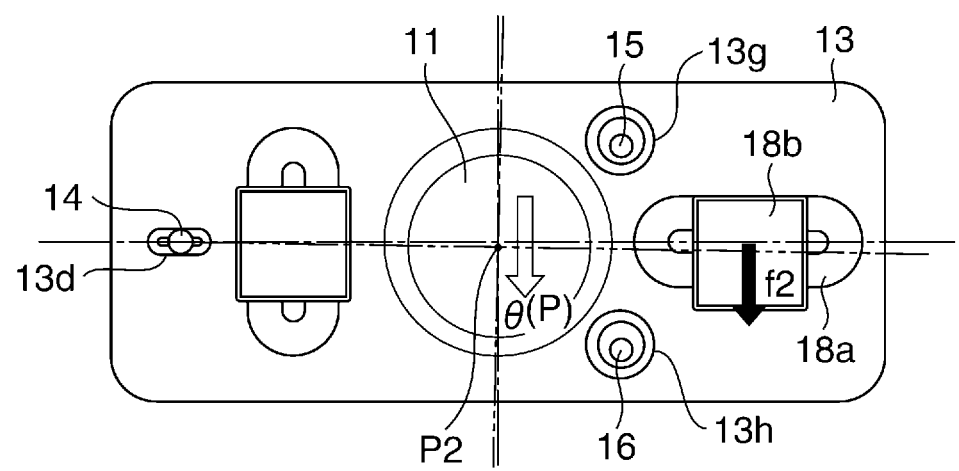
FIG. 7 is a view showing a state where forward power is applied to a second coil of a second actuator of the image shake correction device.

FIG. 7 shows a state where forward power is applied to the second coil 18a of the second actuator 18. It should be noted that an illustration of the movable barrel 12 is omitted in FIG. 7 for convenience of description.

In the state shown in FIG. 7, a Lorentz force is generated between the coil 18a and magnet 18b of the second actuator 18, so that a force f2 acting in the P direction is applied to the magnet 18b fixed to the movable barrel 12. As a result, the movable barrel 12 pivots by an angle of θ about a contact point with the ball 14 (i.e., about a pivotal fulcrum) while causing the balls 15, 16 to roll, so that the center of the correction lens 11 held by the movable barrel 12 moves to a position denoted by symbol P2. Hereinafter, the direction of arcuate movement of the correction lens 11 at that time will be referred to as the second direction. With the combined movement of the movable barrel 12 in the first and second directions, the center of the correction lens 11 can move to an arbitrary position on the plane perpendicular to the optical axis.

The stationary base plate 13 and the movable barrel 12 are urged by an urging unit (schematically denoted by arrow Z in FIG. 4) in directions toward each other to hold the balls 14 to 16 therebetween, so that a holding force is applied to the balls 14 to 16. As a result, for example, the ball 14 is prevented from being detached from the guide groove 13d with movement of the movable barrel 12. Also, the contact point between the ball 14 and the movable barrel 12 is prevented from being displaced with movement of the movable barrel 12. As the urging unit, there can be mentioned, for example, a unit that utilizes urging forces of springs and a unit that utilizes magnetic attraction forces of magnets, but these are not limitative.

According to this embodiment, the movable barrel 12 can move in two different directions while being rollably supported by the balls 14 to 16, as described above. More specifically, the movable barrel 12 moves in the first direction while causing the balls 14 to 16 to roll, and pivots in the second direction about the contact point with the ball 14, i.e., about the pivotal fulcrum, while causing the balls 15, 16 to roll. It is therefore possible to reduce a sliding friction force occurring with movement of the movable barrel 12. As a result, loads on the actuators 17, 18 for driving the movable barrel 12 can be reduced and the positioning accuracy of the movable barrel 12 can be improved.

It should be noted that in this embodiment, an example has been described in which voice coil motors are used as the actuators 17, 18. Alternatively, it is possible to use stepping motors, ultrasonic motors using piezoelectric elements, ultra-magnetostriction actuators, or the like.

In this embodiment, the first actuator 17 generates a driving force acting in the direction coincident with the direction in which the ball 14 is guided by the guide groove 13d, but this is not limitative. In a case that the acting direction of the driving force of the actuator 17 does not coincide with the direction in which the ball 14 is guided, power supplies to the actuators 17, 18 can simultaneously be controlled such that the resultant force of driving forces of these actuators acts in a desired direction to move the correction lens 11 in the plane perpendicular to the optical axis.

(Second Embodiment)

Next, an image shake correction device according to a second embodiment of this invention will be described with reference to FIGS. 8A and 8B. It should be noted that like elements similar to those of the first embodiment are denoted by like numerals, and a description thereof will be omitted.

Figure 8A:
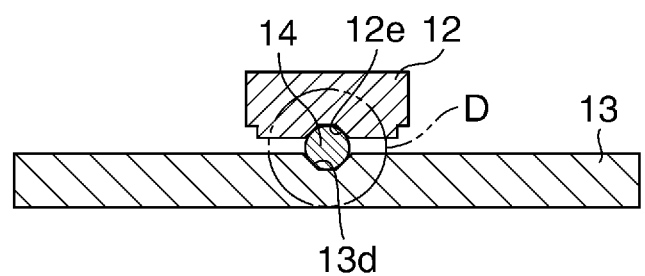
FIG. 8A is a section view of an essential part of an image shake correction device according to a second embodiment of this invention.
Figure 8B:
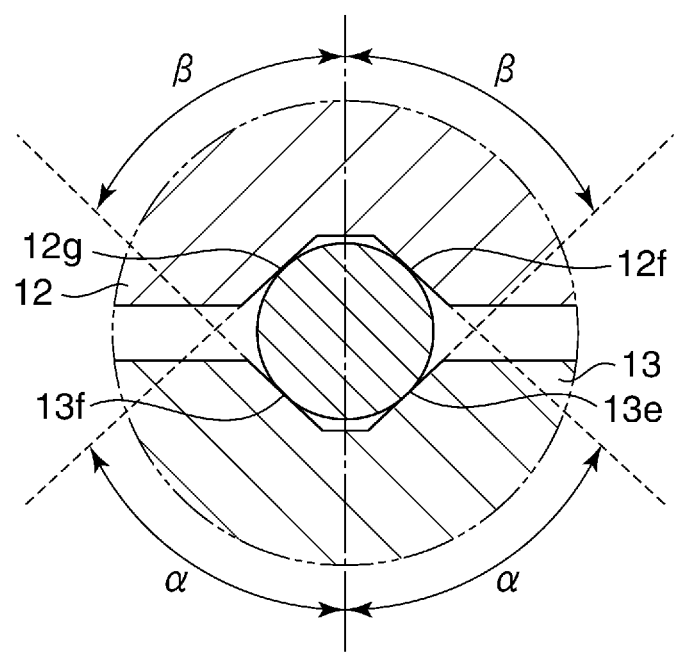
FIG. 8B is an enlarged view of D part of FIG. 8A.

FIG. 8A shows in section view an essential part of the image shake correction device according to the second embodiment, and FIG. 8B shows D part of FIG. 8A in enlarged view.

In this embodiment, the movable barrel 12 is formed with a guide groove 12e of a V-shape in cross section, which is similar to the guide groove 13d formed in the stationary base plate 13. When the movable barrel 12 is at the reference position shown in FIGS. 3 and 4, the guide groove 12e is disposed facing the guide groove 13d of the stationary base plate 13 as seen in the optical axis direction and extends in the same direction as the guide groove 13d (see FIG. 8A). As shown in FIG. 8B, the guide groove 12e has inclined surfaces 12f, 12g that form therebetween a groove angle (open angle) 2α greater than a groove angle 2β formed between the inclined surfaces 13e, 13f of the guide groove 13d formed in the stationary base plate 13. It should be noted that the guide groove 12e is an example of a second guide groove of this invention.

The ball 14 is in contact with each of the inclined surfaces 12f, 12g of the guide groove 12e at one point, so that the ball 14 is in contact at two points with the guide groove 12e. Thus, the ball 14 is supported at four points to be rollable in the Y direction in a state held between the movable barrel 12 and the stationary base plate 13.

In this embodiment, the ball 14 is made in contact at two points with the guide groove 12e of a V-shape in cross section which is formed in the movable barrel 12 and similar to the guide groove 13d of the stationary base plate 13, and the groove angle 2α formed between the inclined surfaces 12f, 12g of the guide groove 12e is made greater than the groove angle 2β formed between the inclined surfaces 13e, 13f of the guide groove 13d formed in the stationary base plate 13. In other words, the depth of the guide groove 12e is made shallower than that of the guide groove 13d.

As described above, the ball 14 is held between the guide grooves 12e and 13d, so that only rolling friction is produced. It is therefore possible to reduce load for pivoting the movable barrel 12. It is also possible to prevent the pivot center of the movable barrel 12 from being displaced, even if external impact is applied to the movable barrel 12. Thus, a highly accurate, highly reliable image shake correction device can be provided. In respect of other construction, function, and effect, this embodiment is the same as the first embodiment.

(Third Embodiment)

Next, an image shake correction device according to a third embodiment of this invention will be described with reference to FIGS. 9A and 9B. It should be noted that like elements similar to those of the first embodiment are denoted by like numerals, and a description thereof will be omitted.

Figure 9A:
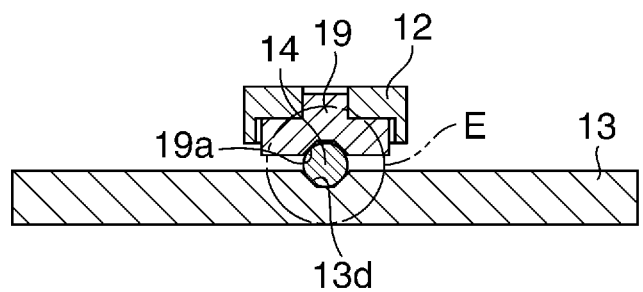
FIG. 9A is a section view of an essential part of an image shake correction device according to a third embodiment of this invention.
Figure 9B:
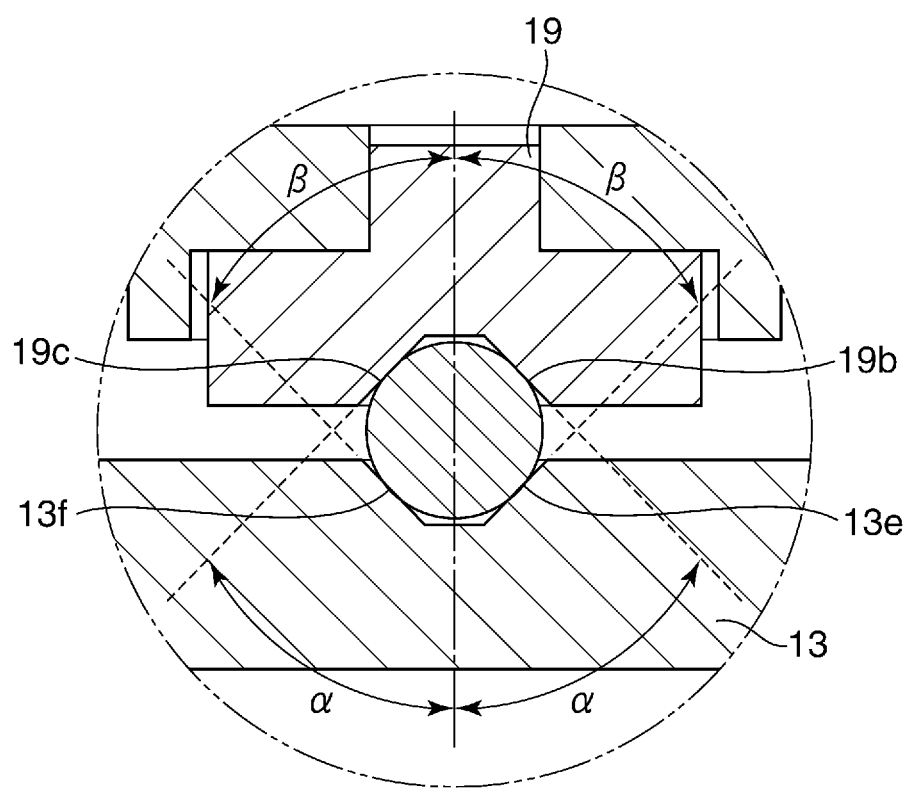
FIG. 9B is an enlarged view of E part of FIG. 9A.

FIG. 9A shows in section view an essential part of the image shake correction device according to the third embodiment, and FIG. 9B shows E part of FIG. 9A in enlarged view.

In this embodiment, a rotary member 19 is supported to be rotatable relative to the movable barrel 12 about an axis passing through the center of the ball 14 and extending parallel to the optical axis. The rotary member 19 is formed with a guide groove 19a of a V-shape which is similar to the guide groove 13d formed in the stationary base plate 13. The guide groove 19a is disposed facing the guide groove 13d of the stationary base plate 13 as seen in the optical axis direction, and extends in the same direction as the guide groove 13d.

It should be noted that in this embodiment, inclined surfaces 19b, 19c of the guide groove 19a form therebetween a groove angle $2\alpha$ equivalent to the groove angle $2\beta$ formed between the inclined surfaces 13e, 13f of the guide groove 13d formed in the stationary base plate 13. However, the groove angle $2\alpha$ can be made greater than the groove angle $2\beta$, as with the second embodiment.

The ball 14 is made in contact at one point with each of the inclined surfaces 19b, 19c of the guide groove 19a. Thus, the ball 14 is in contact at two points with the guide groove 19a. When held between the movable barrel 12 and the stationary base plate 13, the ball 14 is supported by four points to be rollable in the Y direction. The movable barrel 12 is supported to be pivotable relative to the rotary member 19 about an axis extending parallel to the optical axis.

In this embodiment, the V-shaped guide groove 19a is formed in the rotary member 19 supported to be rotatable relative to the movable barrel 12, and the ball 14 is made in contact at two points with the guide groove 19a of the rotary member 19. Furthermore, the movable barrel 12 is supported to be pivotable about the axis extending parallel to the optical axis.

Thus, load for pivoting the movable barrel 12 can be largely reduced. In addition, the pivotal fulcrum for the movable barrel 12 can be prevented from being displaced, even if external impact is applied to the movable barrel 12. It is therefore possible to provide a highly accurate, highly reliable image shake correction device and an optical apparatus having the image shake correction device.

In this embodiment, since the movable barrel 12 is supported to be pivotable relative to the rotary member 19, the contact position between ball 14 and the guide groove 19a can be prevented from being displaced, even if the pivot angle $\theta$ of the movable barrel 12 is made large. It is therefore possible to position the correction lens 11 in a wider range. In respect of other construction, function, and effect, this embodiment is the same as the first embodiment.

It should be noted that this invention is not limited in construction to the examples described in the embodiments, and various changes and modifications may be made in terms of material, shape, size, form, number, installation position, etc. without departing from the spirit and scope of the invention.

For example, although in the embodiments the lens barrel has been described as an example of the optical apparatus with image shake correction device, this invention is also applicable to other optical apparatus such as digital camera, digital video camera, interchangeable lens for digital single-lens reflex camera, and binocular, and is further applicable to an image pickup unit of electronic equipment such as a cellular phone or a game machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-079556, filed Mar. 31, 2011, which is hereby incorporated by reference herein in its entirety.

What is claimed is:

1. An image shake correction device comprising:
    a stationary member;
    a movable member configured to be moveable linearly in a first direction relative to the stationary member and rotatable relative to the stationary member in a second direction different from the first direction;
    a first guide groove having inclined surfaces that are not parallel to each other and extending in the first direction provided in one of the stationary member or the movable member;
    a receiving portion provided in one of the stationary member or the movable member;
    a first rolling member held between the stationary member and the moveable member on the first guide groove;
    a second rolling member held between the stationary member and the movable member on the receiving portion; and
    a drive unit configured to drive said movable member in the first and second directions,
    wherein the first rolling member is in contact at each of the inclined surfaces,
    wherein the first rolling member is in contact at one point with the other of the stationary member or the movable member,
    wherein in a case where the movable member moves linearly in the first direction, the first rolling member rolls along the first guide groove and the second rolling member rolls on the receiving portion, and
    wherein in a case where the movable member rotates in the second direction, the first rolling member functions as a pivotal fulcrum for the movable member and the second rolling member rolls on the receiving portion.

2. The image shake correction device according to claim 1, wherein the movable member is configured to hold an optical system for image shake correction.

3. The image shake correction device according to claim 2, wherein:
    the drive unit includes a drive device configured to move said movable member in the first direction, and
    the drive device is disposed between the first guide groove and an optical axis of the optical system for image shake correction.

4. The image shake correction device according to claim 2, wherein the first direction is a direction of a line connecting the pivotal fulcrum for the movable member with a center of the optical system for image shake correction as seen in a case where the movable member is at a reference position.

5. An optical apparatus comprising:
    an optical element;
    a stationary member;
    a movable member configured to be movable linearly in a first direction relative to the stationary member and rotatable relative to the stationary member in a second direction different from the first direction;
    a first guide groove having inclined surfaces that are not parallel to each other and extending in the first direction provided in one of the stationary member or the movable member;
    a receiving portion provided in one of the stationary member or the movable member;
    a first rolling member held between the stationary member and the movable member on the first guide groove;
    a second rolling member disposed on the receiving portion and held between the stationary member and the movable member on the receiving portion; and
    a drive unit configured to drive the movable member in the first and second directions,
    wherein the first rolling member is in contact at each of the inclined surfaces, wherein the first rolling member is in contact at one point with the other of the stationary member or the movable member, wherein in a case where the movable member moves linearly in the first direction, the first rolling member rolls along the first guide groove and the second rolling member rolls on the receiving portion, and wherein in a case where the movable member rotates in the second direction, the first rolling member functions as a pivotal fulcrum for the movable member and the second rolling member rolls on the receiving portion.

6. An image pickup apparatus comprising:
an image pickup device;
a stationary member;
a movable member configured to be movable linearly in a first direction relative to the stationary member and rotatable relative to the stationary member in a second direction different from the first direction;
a first guide groove having inclined surfaces that are not parallel to each other and extending in the first direction provided in one of the stationary member or the movable member;
a receiving portion provided in one of the stationary member or the movable member;
a first rolling member held between the stationary member and the movable member on the first guide groove;
a second rolling member held between the stationary member and the movable member on the receiving portion; and
a drive unit configured to drive the movable member in the first and second directions,
wherein the first rolling member is in contact at each of the inclined surfaces,
wherein the first rolling member is in contact at one point with the other of the stationary member or the movable member,
wherein in a case where the movable member moves linearly in the first direction, the first rolling member rolls along the first guide groove and the second rolling member rolls on the receiving portion, and
wherein in a case where the movable member rotates in the second direction, the first rolling member functions as a pivotal fulcrum for the movable member and the second rolling member rolls on the receiving portion.

7. An image shake correction device comprising:
a stationary member;
a movable member configured to be movable linearly in a first direction relative to the stationary member and rotatable relative to the stationary member in a second direction different from the first direction;
a first guide groove having first inclined surfaces that are not parallel to each other and extending in the first direction provided in one of the stationary member or the movable member;
a second guide groove having second inclined surfaces that are not parallel to each other and extending in the first direction provided in the other of the stationary member or the movable member;
a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion, and
wherein in a case where the movable member rotates in the second direction, the first rolling member functions as a pivotal fulcrum for the movable member and the second rolling member rolls on the receiving portion.

8. The image shake correction device according to claim 7, wherein a second groove angle formed between the second inclined surfaces is larger than a first groove angle formed between the first inclined surfaces.

9. An optical apparatus comprising:
an optical element;
a stationary member;
a movable member configured to be movable linearly in a first direction relative to the stationary member and rotatably relative to the stationary member in a second direction different from the first direction;
a first guide groove having first inclined surfaces that are not parallel to each other and extending in the first direction provided in one of the stationary member or the movable member;
a second guide groove having second inclined surfaces that are not parallel to each other and extending in the first direction provided in the other of the stationary member or the movable member;
a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion, and
wherein in a case where the movable member rotates in the second direction, the first rolling member functions as a pivotal fulcrum for the movable member and the second rolling member rolls on the receiving portion.

10. The optical apparatus according to claim 9, wherein a second groove angle formed between the second inclined surfaces is larger than a first groove angle formed between the first inclined surfaces.

11. An image pickup apparatus comprising:
an image pickup device;
a stationary member;
a movable member configured to be moveable linearly in a first direction relative to the stationary member and rotatably relative to the stationary member in a second direction different from the first direction;
a first guide groove having first inclined surfaces that are not parallel to each other and extending in the first direction provided in one of the stationary member or the movable member;
a second guide groove having second inclined surfaces that are not parallel to each other and extending in the first direction provided in the other of the stationary member or the movable member;

a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion, and
wherein in a case where the movable member rotates in the second direction, the first rolling member functions as a pivotal fulcrum for the movable member and the second rolling member rolls on the receiving portion.

12. The image pickup apparatus according to claim 11, wherein a second groove angle formed between the second inclined surfaces is larger than a first groove angle formed between the first inclined surfaces.

13. An image shake correction device comprising:
a stationary member;
a movable member configured to be movable linearly in a first direction relative to the stationary member and rotatable relative to the stationary member in a second direction different from the first direction;
a rotary member configured to be rotatable relative to the movable member, and
a first guide groove having first inclined surfaces that are not parallel to each other and extending in the first direction provided in the stationary member;
a second guide groove having second inclined surfaces that are not parallel to each other and extending in the first direction provided in the rotary member;
a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion, and
wherein in a case where the rotatable member rotates in the second direction, the second rolling member rolls on the receiving portion.

14. The image shake correction device according to claim 13, wherein a second groove angle formed between the second inclined surfaces is larger than a first groove angle formed between the first inclined surfaces.

15. An optical apparatus comprising:
an optical element;
a stationary member;
a movable member configured to be movable linearly in a first direction relative to the stationary member and rotatably relative to the stationary member in a second direction different from the first direction;
a rotary member configured to be rotatable relative to the movable member;
a first guide groove having first inclined surfaces that are not parallel to each other and extending in the first direction provided in the stationary member;
a second guide groove having second inclined surfaces that are not parallel to each other and extending in the first direction provided in the rotary member;
a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion,
wherein in a case where the rotary member rotates in the second direction, the second rolling member rolls on the receiving portion.

16. The optical apparatus according to claim 15, wherein a second groove angle formed between the second inclined surfaces is larger than a first groove angle formed between the first inclined surfaces.

17. An image pickup apparatus comprising:
an image pickup device;
a stationary member;
a movable member configured to be movable linearly in a first direction relative to the stationary member and rotatably relative to the stationary member in a second direction different from the first direction;
a rotary member configured to be rotatable relative to the movable member;
a first guide groove having first inclined surfaces that are not parallel to each other and extending in the first direction provided in the stationary member;
a second guide groove having second inclined surfaces that are not parallel to each other and extending in the first direction provided in the rotary member;
a receiving portion provided in one of the stationary member or the movable member;
a first rolling member held between the first guide groove and the second guide groove;
a second rolling member held between the stationary member and the movable member on the receiving portion; and
a drive unit configured to drive the movable member in the first and second directions,
wherein the first rolling member is in contact at each of the first inclined surfaces and the second inclined surfaces,
wherein in a case where the movable member moves linearly in the first direction, the first rolling member rolls along the first guide groove and the second rolling member rolls on the receiving portion, and
wherein in a case where the rotary member rotates in the second direction, the second rolling member rolls on the receiving portion.

18. The image pickup apparatus according to claim 17, wherein a second groove angle formed between the second inclined surfaces is larger than a first groove angle formed between the first inclined surfaces.

* * * * *